(12) United States Patent
Giardina et al.

(10) Patent No.: US 12,271,432 B2
(45) Date of Patent: Apr. 8, 2025

(54) MANAGEMENT AND ORGANIZATION OF DATABASE SEARCH RESULTS

(71) Applicant: Palantir Technologies Inc., Palo Alto, CA (US)

(72) Inventors: Robert Giardina, Falls Church, VA (US); Justin Streufert, Frederick, MD (US); Christopher Luck, Arlington, VA (US); Wenshuai Hou, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 99 days.

(21) Appl. No.: 17/348,377

(22) Filed: Jun. 15, 2021

(65) Prior Publication Data

US 2021/0319070 A1 Oct. 14, 2021

Related U.S. Application Data

(63) Continuation of application No. 15/479,510, filed on Apr. 5, 2017, now abandoned.

(60) Provisional application No. 62/439,844, filed on Dec. 28, 2016.

(51) Int. Cl.
*G06F 16/00* (2019.01)
*G06F 7/00* (2006.01)
*G06F 16/242* (2019.01)
*G06F 16/248* (2019.01)
*G06F 16/951* (2019.01)

(52) U.S. Cl.
CPC ......... *G06F 16/951* (2019.01); *G06F 16/242* (2019.01); *G06F 16/248* (2019.01)

(58) Field of Classification Search
CPC ..... G06F 16/951; G06F 16/242; G06F 16/248
USPC ....................................................... 707/706
See application file for complete search history.

(56) References Cited

U.S. PATENT DOCUMENTS

| | | |
|---|---|---|
| 6,208,985 B1 | 3/2001 | Krehel |
| 6,233,586 B1 | 5/2001 | Chang et al. |
| 6,519,592 B1 | 2/2003 | Getchius et al. |
| 6,704,726 B1 | 3/2004 | Amouroux |
| 6,839,702 B1 | 1/2005 | Patel et al. |
| 2003/0163275 A1* | 8/2003 | Farrell ................ G06F 11/3476 714/E11.204 |
| 2006/0206475 A1 | 9/2006 | Naam et al. |
| 2007/0022125 A1 | 1/2007 | Salam et al. |
| 2008/0243784 A1* | 10/2008 | Stading ............... G06F 16/3325 |
| 2010/0145936 A1 | 6/2010 | Grinstein et al. |
| 2010/0169325 A1 | 7/2010 | Dugan et al. |
| 2011/0113062 A1 | 5/2011 | Quinlan et al. |
| 2012/0030264 A1 | 2/2012 | Horn |

(Continued)

FOREIGN PATENT DOCUMENTS

EP 3343408 A1 7/2018

OTHER PUBLICATIONS

"U.S. Appl. No. 14/936,277, Final Office Action mailed Sep. 21, 2017", 25 pgs.

(Continued)

*Primary Examiner* — Raquel Perez-Arroyo
(74) *Attorney, Agent, or Firm* — Faegre Drinker Biddle & Reath LLP

(57) ABSTRACT

Example embodiments relate to indicating results that overlap between multiple sets of search results.

19 Claims, 16 Drawing Sheets

(56) References Cited

U.S. PATENT DOCUMENTS

| | | | |
|---|---|---|---|
| 2012/0089624 A1* | 4/2012 | Subramaniam | G06F 16/2423 |
| | | | 707/752 |
| 2012/0102044 A1 | 4/2012 | Ott, IV et al. | |
| 2012/0324002 A1 | 12/2012 | Chen | |
| 2013/0232399 A1 | 9/2013 | Anick et al. | |
| 2014/0195515 A1 | 7/2014 | Baker et al. | |
| 2015/0120744 A1* | 4/2015 | Horn | G06F 16/41 |
| | | | 707/740 |
| 2015/0193630 A1* | 7/2015 | Von Kaenel | G06Q 40/08 |
| | | | 707/785 |
| 2015/0324259 A1* | 11/2015 | Bastawala | H04L 67/563 |
| | | | 714/4.11 |
| 2016/0012111 A1* | 1/2016 | Pattabhiraman | G06F 16/284 |
| | | | 707/722 |
| 2017/0068712 A1 | 3/2017 | Streufert et al. | |
| 2018/0181657 A1 | 6/2018 | Giardina et al. | |

OTHER PUBLICATIONS

"U.S. Appl. No. 15/479,510, Examiner Interview Summary mailed Jul. 27, 2020", 3 pgs.

"U.S. Appl. No. 15/479,510, Final Office Action mailed Dec. 15, 2020", 50 pgs.

"U.S. Appl. No. 15/479,510, Final Office Action mailed Dec. 26, 2019", 28 pgs.

"U.S. Appl. No. 15/479,510, First Action Interview—Office Action Summary mailed Aug. 2, 2019", 5 pgs.

"U.S. Appl. No. 15/479,510, First Action Interview—Pre-Interview Communication mailed Apr. 19, 2019", 4 pgs.

"U.S. Appl. No. 15/479,510, Non Final Office Action mailed Apr. 3, 2020", 39 pgs.

"U.S. Appl. No. 15/479,510, Response filed Mar. 6, 2020 to Final Office Action mailed Dec. 26, 2019", 14 pgs.

"U.S. Appl. No. 15/479,510, Response filed Aug. 12, 2020 to Non Final Office Action mailed Apr. 3, 2020", 17 pgs.

"U.S. Appl. No. 15/479,510, Response filed Sep. 5, 2019 to First Action Interview—Office Action Summary mailed Aug. 2, 2019", 14 pgs.

"Data mining", Wikipedia, [Online] Retrieved from the Internet: https://en.wikipedia.org/w/index.php?title=Data_mining&oldid=756580747, (Dec. 25, 2016), 13 pgs.

"European Application Serial No. 17210839.1, Communication Pursuant to Article 94(3) EPC mailed May 23, 2019", 7 pgs.

"European Application Serial No. 17210839.1, Extended European Search Report mailed Mar. 13, 2018", 12 pgs.

"European Application Serial No. 17210839.1, Response filed Oct. 2, 2019 to Communication Pursuant to Article 94(3) EPC mailed May 23, 2019", 8 pgs.

"European Application Serial No. 17210839.1, Response filed Dec. 21, 2018 to Extended European Search Report mailed Mar. 13, 2018", 3 pgs.

"European Application Serial No. 17210839.1, Summons to Attend Oral Proceedings mailed Feb. 14, 2020", 8 pgs.

* cited by examiner

| ☷ TABLE | ⌇ REPORTS | ▢ READING |
|---|---|---|

⁞⁞ Group By ▾   ⊞ Columns

| YEAR/MONTH ▾ | EXPORTER | IMPORTER |
|---|---|---|
| 07-01-2016 | URUGUAY | BRAZIL |
| 07-01-2016 | CHILE | BRAZIL |
| 07-01-2016 | ECUADOR | BRAZIL |
| 07-01-2016 | MOROCCO | BRAZIL |
| 07-01-2016 | OTHER ASIA | BRAZIL |
| 07-01-2016 | SINGAPORE | BRAZIL |
| 07-01-2016 | PORTUGAL | BRAZIL |
| 07-01-2016 | PERU | BRAZIL |
| 07-01-2016 | INDONESIA | BRAZIL |
| 07-01-2016 | CHILE | BRAZIL |
| 07-01-2016 | NEW ZEALAND | BRAZIL |
| 07-01-2016 | ARGENTINA | BRAZIL |
| 07-01-2016 | NEW ZEALAND | BRAZIL |
| 07-01-2016 | ITALY | BRAZIL |
| 07-01-2016 | FRANCE, MONACO | BRAZIL |
| 07-01-2016 | PORTUGAL | BRAZIL |
| 07-01-2016 | CHILE | BRAZIL |
| 07-01-2016 | CHILE | BRAZIL |

Results 1-100 of 165,223,045

FIG. 8

BALTIMORE GYMNAST ✏
COLLECTION 0

City matches wildcard baltimore

Disable this Filter

Occupation contains keywords gymnast

Prim. Age is at least 55

⊕ Add a Filter

FIG. 9

| SEARCH | DATA SETS | TABLE | REPORTS |
|---|---|---|---|
| Martin 🔍 | | ⁞⁞ Group By ▾   Columns | |
| Show more options | | DATE ▾ | FROM NAME |
| 106941 results in 5 collections: | | 04-06-2002 | USER 1 |
| | | 03-20-2002 | USER 2 |
| COLLECTION 1 | 34 | 03-05-2002 | USER 3 |
| COLLECTION 2 | 1 | 02-27-2002 | USER 4 |
| | | 02-07-2002 | USER 5 |
| COLLECTION 3 | 932 | 02-07-2002 | USER 6 |
| COLLECTION 4 | 105688 | 02-07-2002 | USER 6 |
| | | 02-06-2002 | USER 7 |
| EMAIL COLLECTION | | 02-06-2002 | USER 8 |
| All Matches Save as Data Set | 286 | 02-06-2002 | USER 9 |
| | | 02-06-2002 | USER 10 |
| Message Headers | 164 | 02-05-2002 | USER 11 |
| Message Text | 157 | 02-05-2002 | USER 12 |
| From Name16 | | 02-05-2002 | USER 13 |
| To Name123 | | 02-05-2002 | USER 14 |
| | | 02-04-2002 | USER 13 |
| | | 02-04-2002 | USER 15 |
| | | Results 1-100 of 286 | |

MANAGEMENT AND ORGANIZATION OF DATABASE SEARCH RESULTS

RELATED APPLICATION(S)

This application is a continuation of U.S. patent application Ser. No. 15/479,510, filed Apr. 5, 2017, which claims the benefit of priority under 35 U.S.C. 119(e) to U.S. Provisional Patent Application No. 62/439,844, filed Dec. 28, 2016, which is incorporated herein by reference in its entirety.

TECHNICAL FIELD

The present disclosure generally relates to the technical field of special-purpose machines that facilitate database search results.

BACKGROUND

Recent data processing applications utilize increasingly large and complex data sets. So called "big data" processing utilizes extremely large data sets, including over billions of data entries, to facilitate complex trend analysis. For example, big data systems can process large volumes of financial transactions and genomics data to identify business trends and prevent diseases, respectively. Though, while large data sets provide a wealth of information, their bulkiness requires specialized processing.

Existing big data tools focus on automated broad investigation, allowing algorithms to run over an extended period of time to produce high level results. While these time-consuming preset processes may run without user intervention, in order to make changes to the analysis scheme, a user must reset the process, wasting prior incomplete process computations. While some programs permit users to manipulate data with lower level detail, these programs cannot accommodate the amount of documents present in big data applications. Hence, users may make use of only a fraction of the data available.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 8 is a screenshot depicting an exemplary interface method for manipulating tables, consistent with embodiments of the present disclosure.

FIG. 9 is a screenshot depicting an exemplary interface method for table-based analysis, consistent with embodiments of the present disclosure.

FIG. 10 is a screenshot depicting an exemplary interface method for search, consistent with embodiments of the present disclosure.

FIG. 11 is a screenshot depicting an exemplary interface method for a reading pane view, consistent with embodiments of the present disclosure.

DETAILED DESCRIPTION

Figure 1:
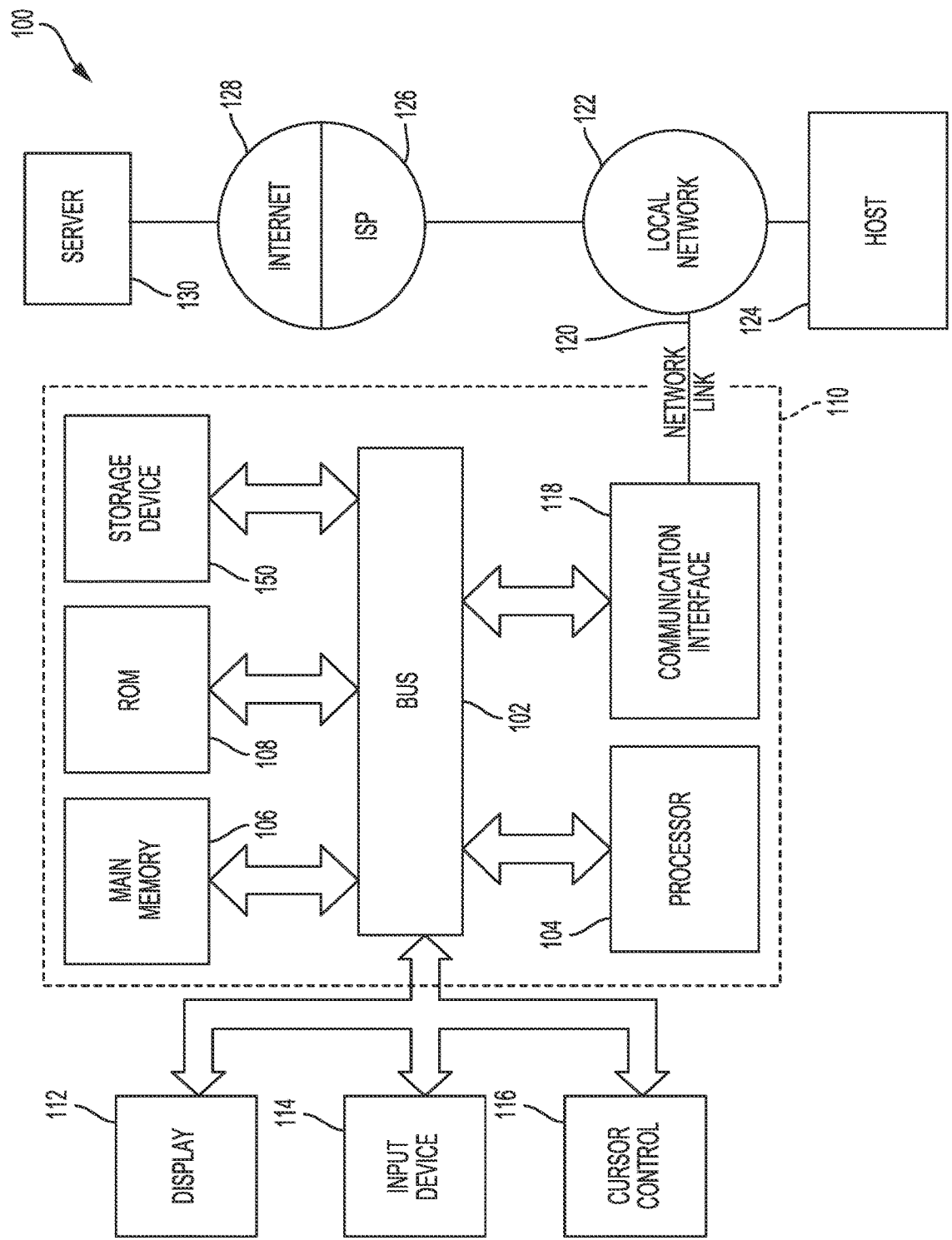
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Government agencies may receive bulk reports, such as tax returns, suspicious activity reports (SARs), or other types of voluminous reports, which may be used to identify suspicious or unlawful activities. However, given the extremely large volume of reports, investigators may experience difficulty in identifying a reasonable number of meaningful cases to pursue. Identifying trends to recognize more extensive violations may prove to be a challenging task. Disclosed tools organize reports of the same format into collections and permit a user to search across multiple collections simultaneously. Disclosed tools may also present automated visualizations of the search results, such as diagrams and distribution graphs, allowing users to build on existing searches to hone in on notable results of interest. To make use of search findings, disclosed mechanisms may allow users to publish, store and distribute, select results and visuals.

For example, during a query session, a user may enter a name to search. Disclosed tools may return a list of documents from different collections containing the name. Results may be organized by arranging predefined fields of these documents in a spreadsheet grid. A user may select a particular grid cell or column to perform a refined search or generate a graph of results, such as a histogram of returned documents based on their creation date. A user may interact with the graph to refine the search by selecting a column to perform a refined search based on the time period of the histogram column. Disclosed tools may export for search results to share with other users, store results for future use, and/or publish results automatically in a formal report.

Disclosed embodiments may relate to searching extremely large numbers of documents, efficiently analyzing search results, and quickly publishing search findings. For example, an interface may provide tools to build complex queries to search sets of documents and provide visualizations illustrating trends in the results. To maintain a consistent user interface that is compatible with numerous search engines, disclosed embodiments may translate search queries from the user interface and reformat results to follow a specific user interface format. Disclosed embodiments may include export tools to make further use of the search results. For example, export tools may allow a user to share graphs, formal reports, or the search environment with other users.

Disclosed embodiments may be designed to scale for searching extremely large numbers of documents. When millions of documents need to be searched, a database may not provide sufficient resources to timely search all documents. A traditional database may also require excessive storage space to store and index the necessary fields of the documents. Accordingly, disclosed embodiments may use a search engine to index all fields of the millions of documents. Embodiments of the present may organize, access, and manipulate documents structured into collections. As an exemplary illustration, a collection may include millions of documents of similar formats. The values of the documents may be stored and indexed as individual fields. The index of a field may link to the location of the corresponding value in a document. Using this structure, disclosed embodiments may apply a single user query across multiple collections that are directed to different document formats.

Existing systems may not be able to accommodate the large numbers of documents that are searched by disclosed embodiments. Further, such systems may not include an interface capable of building complex queries independent of the back end system, or tools to automatically create visualizations and reports based on search results. Disclosed embodiments may have additional benefits not explicitly recited in this disclosure.

Embodiments of the present disclosure further provide a query building interface allowing the user to navigate through collections that include very large data sets. Via the interface, a user can query, order, and view documents from collections. The interface may receive and apply further search criteria to query results, such as receiving a user selection of a graph, plot, or other visual representation of an initial data set. The interface further facilitates a user's navigation through a large collection of documents by linking directly to the document associated with a query result. The interface may also flag documents resulting from a specific query.

Disclosed embodiments may facilitate presenting the results of user queries. The interface may export results, automatically generate reports, and archive query workflows. These output mechanisms facilitate efficient presentation of results in meaningful formats.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), a liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
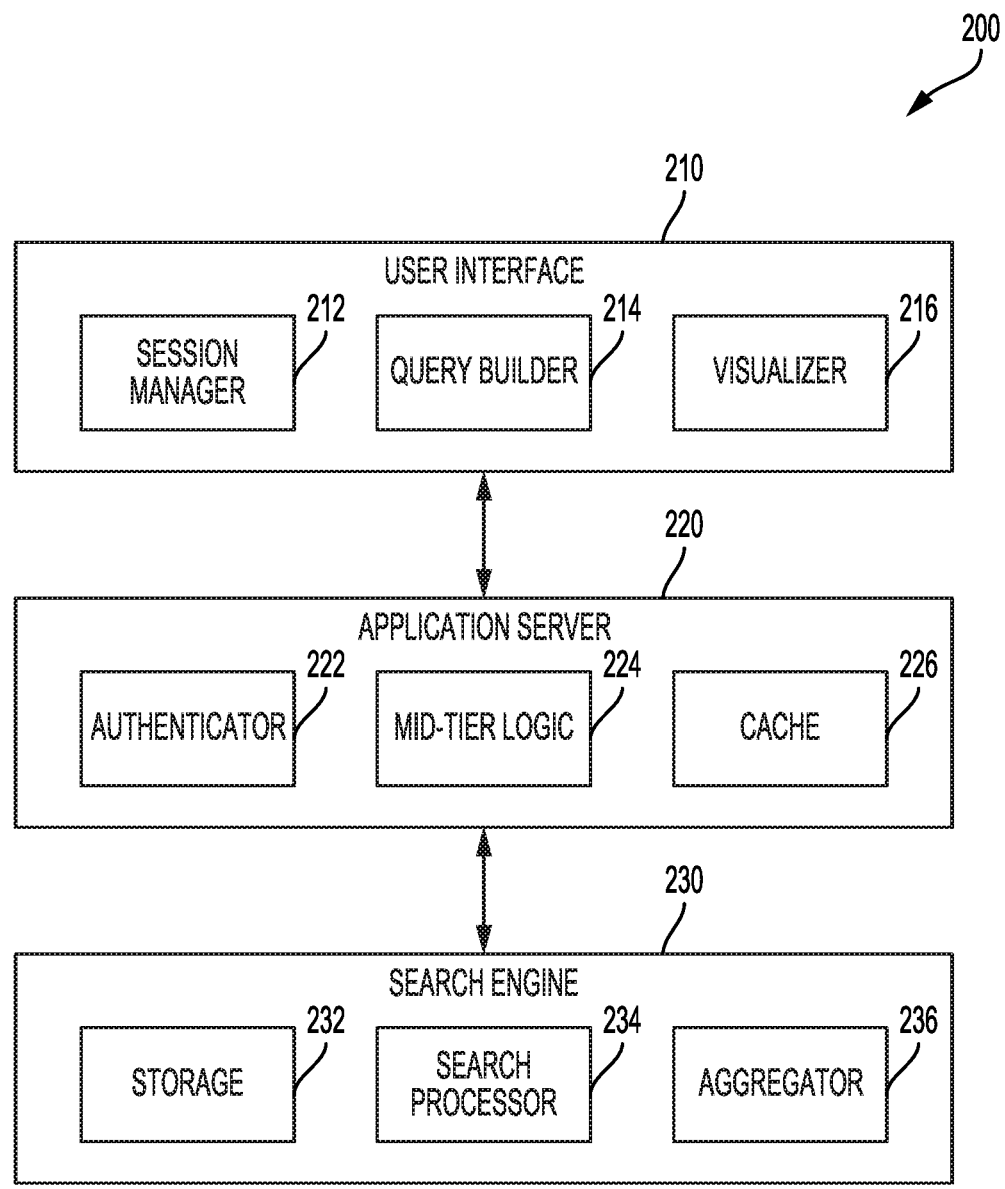
FIG. 2 is a block diagram depicting an exemplary data exploration system, consistent with embodiments of the present disclosure.

FIG. 2 is a block diagram depicting an exemplary data exploration system 200, consistent with embodiments of the present disclosure. Among other things, system 200 facilitates user querying of one or more data sources and display of the query results. System 200 is shown as an arrangement of functional blocks. These functional blocks may be implemented in hardware, software, or a combination of the two. For example, the functional blocks of system 200 may be implemented as special purpose computing devices, such as application specific integrated circuits. In other examples, the functional blocks of system 200 may be implemented as software on specialized hardware.

System 200 may include user interface 210 to receive user input and generate output. User interface 210 may facilitate user interaction with system 200. User interface 210 may receive and process user text entries and graphical selections. For example, user interface 210 may receive signals from input devices, process the signals, and initiate appropriate action based on the input, such as initiating a search, rendering a graphic, or archiving results. Receiving a user-initiated mouse click, for example, may cause user interface 210 to initiate a search query. User interface 210 may also provide output for a user to view. For example, user interface 210 may display graphics, such as search results, on a display device (e.g., a monitor) for the user to view.

In some embodiments, user interface 210 may be a web application, which may run in a generic web browser. For example, user interface 210 may be a CoffeeScript application running on a web browser. In other embodiments, an independently executable program may provide user interface 210.

User interface 210 may include session manager 212 to provide administration during user interactions with system 200. For example, a user may initiate a session on system 200. Based on the session initiation, session manager 212 may set up and maintain a connection between user interface 210 and application server 220, verifying that a search engine 230 is ready to receive queries. To set up the session for a particular user, session manager 212 may load user preferences, retrieve stored results, and tie new session actions to the users account.

In some embodiments, session manager 212 may monitor user interactions with user interface 210. Based on the user action history, session manager 212 may maintain a current state of system 200. Session manager 212 may be able to recall the state of system 200 should the user need to continue working after a break, or should an error cause the session to abruptly crash. For example, session manager 212 may maintain a record of user search queries, flagged documents, and connected databases. Session manager 212 may recall the records after interruptions in the session to recreate the state of system 200 when the user last provided input. For example, a user may enter a series of interrelated queries using user interface 210. A user may provide input to format the results using a particular format, such as forming a bar graph. Due to a malfunction of system 200, user interface 210 may stop running unexpectedly. In this example situation, session manager 212 may recall the prior searches and result formats received from input. Session manager 212 may recreate the state of system 200 prior to the malfunction, which may, for example, advantageously prevent work from being lost.

User interface 210 may include query builder 214 to manage user search queries. Query builder 214 may receive user input and identify it as search query input. In some embodiments, a user may type text into a field of user interface 210. Query builder 214 may identify the text entry of a user as a query command. In some embodiments, user interface 210 may display a visual representation of results. Responsive to a user selection of a region of the visual display, query builder 214 may create a new search query to return a subset of results corresponding to the selection region. For example, user interface 210 may display a histogram based on the creation date of documents resulting from the query "Douglas Hartford." User interface 210 may receive a user selection corresponding to the histogram bar for the year 2009. Responsive to the user selection, query builder 214 may create a new query to retrieve all documents having a creation date in the year 2009 that contain "Douglas Hartford." User selections of other graphics, such as diagrams, trees, tables, and charts may be used by query builder 214 to create similar queries.

Query builder 214 may allow a user to combine queries to filter results. Rather than storing a set of results and filtering the results into a subset, query builder 214 may combine the necessary criteria to obtain the subset into a single search. For example, a user may initially request all documents containing a reference to the entity "Bonny Smith." After viewing the results from the name query, a user may determine that they would further like to refine the results to only show "Bonny Smith" documents from the years 2012 to 2014. To obtain the refined query containing the subset, query builder 214 may combine, based on user input, the query for "Bonny Smith" and the years 2012 to 2014 into a single query, instead of applying the time range query to the actual name query results set.

In another example, a user may want to know if any documents containing "Bonny Smith" from 2012 to 2014 overlap with a set of documents related to transactions by "Clyde Jones" exceeding $10,000. In this example, query builder 214 may generate a new query based on the two queries corresponding to the results sets, rather than aggregating the results entries for each set, comparing them, and generating any overlapping documents. Using a query-based approach may advantageously provide more efficient results because, for example, the query results set from the base searches may not need to be stored or indexed. Instead, a new query may be submitted to readily search the entire collection of indexed documents.

Query builder 214 may generate queries using a standardized format. In some embodiments, a query datatype (e.g., "AbstractQuery") may define the structure used by query builder 214. For example, query builder 214 may initialize an AbstractQuery object that corresponds to given search criteria. Because AbstractQuery may be used to identify a particular set of data, a particular instance of AbstractQuery may represent a specific set of documents. For example, an instance of AbstractQuery may be used as a universal token which is passed between different processes of system 200. Thus, rather than exchanging a list of document numbers or the documents themselves, system 200 may transfer an AbstractQuery instance referencing a collection identifier to identify a particular set of documents.

The AbstractQuery class may define the format for querying various field types (e.g., text, numbers, dates). For example, an AbstractQuery instance may include a tree of Boolean filters to apply, fields to return, set orders, and limits. The class may be extensible to accommodate search field variations of unique data sets. To query documents having unusual data fields (e.g., fields containing Unicode symbols or emoji), query builder 214 may receive and initialize queries using an addendum that extends the AbstractQuery class.

When user interface 210 receives results from queries, user interface 210 may include visualizer 216 to produce graphics illustrating the results. Visualizer 216 may receive query results from application server 220. In some embodiments, visualizer 216 may receive a list of document identifiers, such as unique document index values. The document identifiers may be accompanied by document field values. For example, a document identifier may be sent with entities associated with the document, a location, a timestamp, and a narrative. Other field values may exist to accommodate any data from any document format. The individual fields may be individually indexed.

In some embodiments, visualizer 216 may produce a table of query results for display. Visualizer 216 may organize the results in rows with each column corresponding to a particular field type. For example, a table may include columns for first name, last name, account number, institution, and date for a document. Visualizer 216 may rearrange, organize, and sort the table based on user input. For example, a user may list documents by ascending date of generation.

In some embodiments, visualizer 216 may produce a graph for display. Based on the query results, visualizer 216 may automatically compute values for a chart. Predefined graph formats, such as pie charts, bar charts, histograms, and link diagrams, may allow visualizer 216 to autonomously display relevant graphs.

Visualizer 216 may allow a user to select a column of a table of results. Based on the format of the field of the selected column, visualizer 216 may determine which type of graph to display. For example, for a column that corresponds to a date field, visualizer 216 may generate a histogram illustrating the distribution of the query results over time. The size of the divisions of the histogram may be adjustable and/or predefined by settings. For example, settings may define that the histogram should include only twelve time sections, regardless of the length of the time period of results. User interface 210 may receive input from users to change the formatting of the histogram to meet their needs. In another example, a user may select a column related to a field that is text-based categories, such as institution names. By tallying the number of results for each institution name appearing in the query results, visualizer 216 may automatically generate a pie chart or bar graph of the tallies.

In an embodiment, visualizer 216 may generate a link diagram. The link diagram may include icons for entities (e.g., institutions from which documents originated and persons mentioned in the documents) and documents. Responsive to a user selection of a particular entity, visualizer 216 may display lines corresponding to the documents related to that entity; the documents may, in turn, link to other entities. Thus, visualizer 216 may present a straight forward graphic for determining the path of documents and related parties.

In some embodiments, visualizer 216 may produce a document for display. Responsive to a user selection of a particular field, visualizer 216 may generate a reader view of the document itself. To easily identify the field in the document, visualizer 216 may highlight the selected field. Visualizer 216 may determine the location of the fields in the entire text based on the index values of the fields.

System 200 may include application server 220 to provide network processing resources. Application server 220 may host a variety of support services and act as an interface between user interface 210 and search engine 230.

Application server 220 may include authenticator 222 to manage user identification. To determine the user to which the session belongs, authenticator 222 may receive user identifying information, such as log in credentials (e.g., username and password). Although, more robust security schemes may be used, such as biometric authentication. User authentication may enable application server 220 to retrieve prior session data and restore user workspaces.

Authenticator 222 may facilitate linking with search engine 230. In some embodiments, search engine 230 may require login credentials in order to service queries. Authenticator 222 may provide search engine 230 with the necessary user credentials, such as a user name and password. Authenticating a user at search engine 230 may allow system 200 to track individual user usage of processing resources. Based on a user's usage of search engine 230, system 200 may provide feedback to user to better optimize search strategy. Errant queries, for example, may waste processing resources of search engine 230. By tracking queries per user, system 200 may allow work to be billed on a per query basis.

Application server 220 may include mid-tier logic 224 to translate search queries. Mid-tier logic 224 may receive search queries from user interface 210 and format the queries to send to search engine 230. In some embodiments, mid-tier logic 224 may reformat a query from the search object initialized by query builder 214 and create a new search instruction that may be compatible with search engine 230. For example, query builder 214 may initialize AbstractQuery objects, which are a particular search query variables indicating the search terms. However, in some embodiments, search engine 230 may utilize a search backend, such as an Elasticsearch engine, that may not be able to process AbstractQuery objects. Therefore, Mid-tier logic 224 may process the AbstractQuery object and transform the object into a search request format compatible with the particular search backend. Similarly, in some embodiments, mid-tier logic 224 may translate search results from search engine 230 to send to user interface 210. Mid-tier logic 224 may receive query results in a format native to the particular search backend employed by search engine 230. By reformatting the search results into a format compatible with user interface 210, mid-tier logic 224 may facilitate the efficient production of visuals based on the search results.

In some embodiments, mid-tier logic 224 may support querying multiple collections at once. Mid-tier logic 224 may submit multiple queries to search engine 230 at once and receive multiple results. For example, multiple instances of AbstractQuery may be aggregated and applied to multiple collections of documents having different formats. Mid-tier logic 224 may reformat the multiple queries for various collections into a single query to submit to search engine 230. To support processing of multiple results received from search engine 230 in response to a combined query, mid-tier logic 224 may include processes to compare and separate the search results for the combined query. For example, mid-tier logic 224 may include post-processing functions such as selecting results, joining results, sorting results, and projecting results. Additional functions may be provided to address unique needs of a particular combination of collection formats.

Application server 220 may include cache 226 to store a local copy of search request data. Cache 226 may locally store translated searches and reformatted search results. By maintaining translated versions of frequent or resource intensive searches and results, cache 226 may serve results much more quickly and reduce and reduce the burden on processing resources, such as mid-tier logic 224 and search processor 234.

In some embodiments, cache 226 may include configurable policies. A configuration file may define the amount of data stored by cache 226 and the caching trigger conditions.

System 200 may alter the configuration parameters of cache 226 to match the needs of a given collection or search, based on the available resources of application server 220 and search engine 230. For example, when application server 220 processes large results sets, less memory may be free to devote to caching.

System 200 may include search engine 230 to perform searches. Search engine 230 may receive search requests from, and provide results to, application server 220. In some embodiments, search engine 230 may be a server-based enterprise search engine. For example, search engine 230 may be an Elasticsearch search server. However, because mid-tier logic 224 provide translation processes, search engine 230 may utilize different formats without affecting the user experience.

Search engine 230 may include one or more server hardware units. For example, search engine 230 may include one or more hardware processors (e.g., processor 104) connected to memory hardware (e.g., main memory 106, storage device 110). Search engine 230 may include a wired or wireless network interface (e.g., communication interface 118) that connects the hardware processors to a network (e.g., local network 122, Internet 128). Disclosed hardware may be programmed to perform disclosed functions. For example, memory may include instructions for a processor to perform Elasticsearch functions.

Search engine 230 may include storage 232 to maintain data that is subject to searching. Search engine 230 may use separate collections for each document format type. Storage 232 may include a particular data architecture to facilitate searching.

Figure 3:
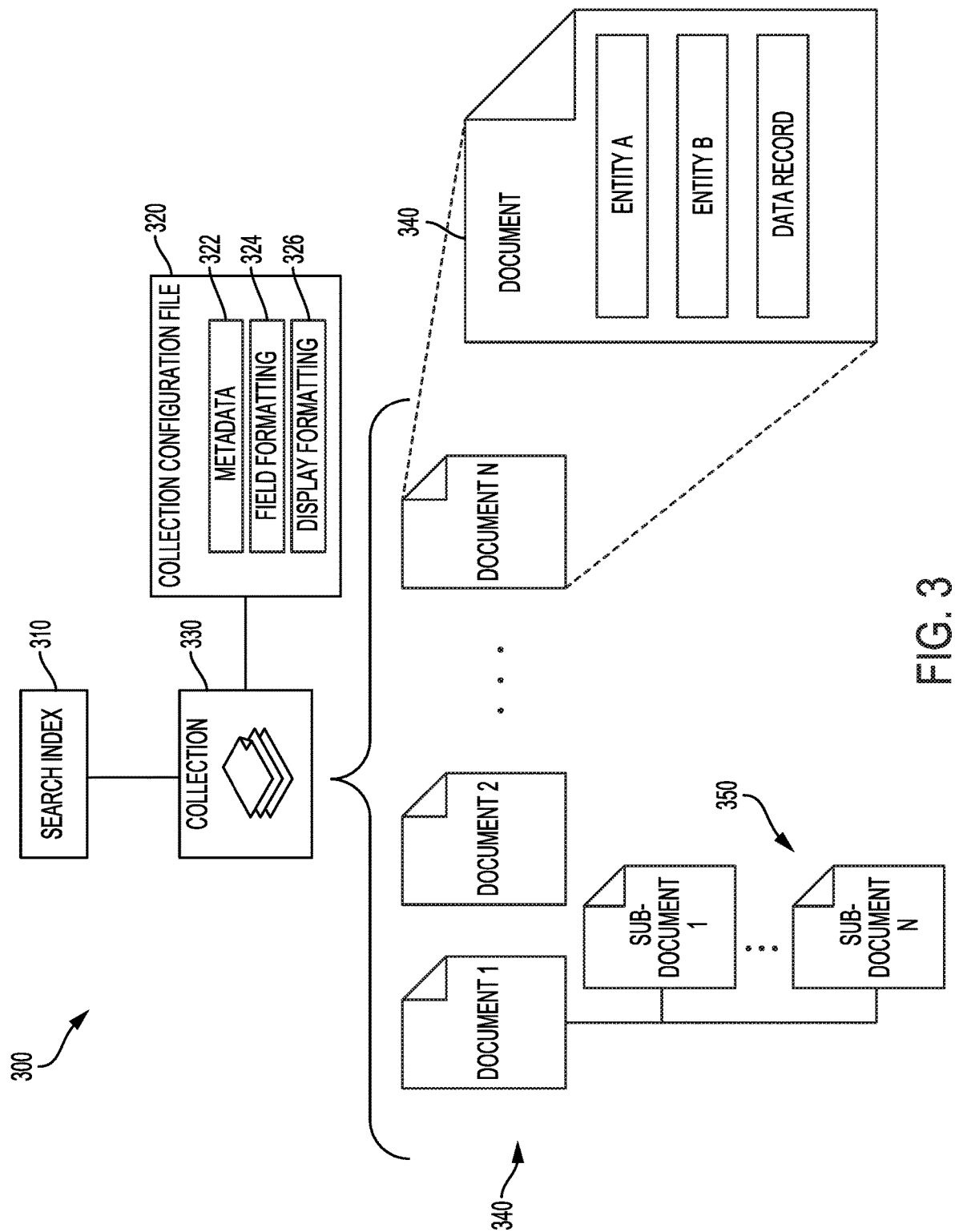
FIG. 3 is a chart illustrating an exemplary data architecture, consistent with embodiments of the present disclosure.

FIG. 3 is a chart illustrating an exemplary data architecture 300, consistent with embodiments of the present disclosure. Data architecture 300 provides a way to organize large volumes of documents into usable records.

Collection 330 may include a large number of documents 340. In some embodiments a collection may include millions of documents 340. Documents 340 of a given collection 330 may all have the same format. For example, documents 340 may have the same fields. As shown, documents 340 may include two entities (e.g., "Entity A" and "Entity B") and a data record. For example, documents 340 could be financial transaction receipts between two parties, where the data record may indicate the details of the transaction (e.g., currency exchanged, date, time, location). Other document collections may include additional fields (not depicted). Example documents may include SARs, tax returns, bank transaction records, etc.

In some embodiments, documents 340 may each include one or more sub documents 350. Documents 340 may be general records, while sub documents 350 may be individual reports. For example, documents 340 may be shipping orders, while sub documents 350 may be individual shipping container logs for the corresponding shipping order. In another example, documents 340 may be monthly user stock transaction account reports with the individual stock trade records for the transactions in the account report may act as sub documents 350. Additional document and sub document formats may be used. However, some embodiments may not include sub documents 350.

Collection 330 may include search index 310 to facilitate information retrieval from collection 330. Search index 310 for every one of documents 340 in collection 330, search index 310 may index each field. For example, search index 310 may index Entity A and Entity B separately. In an embodiment, search index 310 may include a corresponding location of the indexed field within a document. Search index 310 may indicate the line or character range for a particular indexed field. For example, search index 310 may indicate that Entity A (e.g., "John Huckleberry") is displayed on the fifth line of the document. Based on the particular search backend, search index 310 may follow different formats. For example, when search engine 230 is an Elasticsearch search engine, search index 310 may follow a format for use in an Elasticsearch server.

Collection 330 may include collection configuration file 320 to define the type of documents stored in collection 330. Collection 330 may include a plethora of documents that follow the same format. Collection configuration file 320 identifies the common format of the documents in collection 330. For example, when documents 340 correspond to currency transactions, collection configuration file 320 may indicate which fields corresponds to the entities involved in the transaction, the currencies used, and the time toe exchange occurred.

Collection configuration file 320 may include metadata 322 to generally describe collection 330. Metadata 322 may indicate how collection 330 is implemented. For example, metadata 322 may include a version number and a title for collection 330. Metadata 322 may include other information such as a last revision date or the number of documents in the collection.

Collection configuration file 320 may include field formatting 324 to define the field types of formats for the type of documents stored in collection 330. As shown, field formatting 324 may indicate that documents 340 contain three text fields: Entity A, Entity B, and Data Record. For example, field formatting may indicate that Entity A and Entity B are text strings that represent entities, while data record may be a longer text narrative describing the transaction.

Collection configuration file 320 may include display formatting 326 to describe how various fields of documents should be displayed in user interface 210. Display formatting 320 may indicate the style, format, and layout for fields of documents 340. For example, display formatting 326 may indicate that Entity A and Entity B should be displayed in all capital letters. In another example, display formatting 326 may indicate that when an entity corresponds to a person's name, the name should be display as "LAST NAME, FIRST NAME." For dates and times, display formatting 326 may indicate which time zone and notation to use (e.g., Month-Date-Year or Date-Month-Year). Other fields may have additional configuration display format options.

In some embodiments, collection configuration file 320 may include access control data. Collection configuration file 320 may identify parties that are allowed to access the corresponding collection 330. For example, when a collection includes classified documents, collection configuration file 320 may identify the security clearance needed to search and/or view the collection. Search engine 230 may receive user authentication credentials from authenticator 222 to permit searching and viewing of restricted documents.

Returning to FIG. 2, storage 232 of search engine 230 may store collection 330, search index 310, and collection configuration file 320. Storage 232 may provide access to these files for use by search engine 230 in fulfilling search requests.

Search engine 230 may include search processor 234 to process search requests. Search processor 234 may receive and fulfill translated search requests from mid-tier logic 224. Search processor 234 may access search index 310 to apply the Boolean logic of a received search. For example, search processor 234 may search across denormalized indices of multi-valued documents. Search engine 230 may receive search results based on the query.

Search engine 230 may include aggregator 236 to collect search results. As search processor 234 generates results, aggregator 236 may receive and store the generated results. Once the search processing is complete, aggregator 236 may forward the total results to application server 220. For example, aggregator 236 may serve as a local cache of results to provide complete results in a single transmission. Aggregator 236 may apply a format to the documents based on the particular search platform of search engine 230.

The particular functional blocks and arrangement of system 200 may be altered from the depicted configuration based on particular implementation details. In some embodiments, functional blocks may be combined or subdivided based on the available processing resources and hardware. Some functional blocks may be unused or omitted based on the particular application of system 200. For example, based on the given format of the collections that are subject to search, the various functional components described above may be reconfigured to better query the underlying data.

Figure 4:
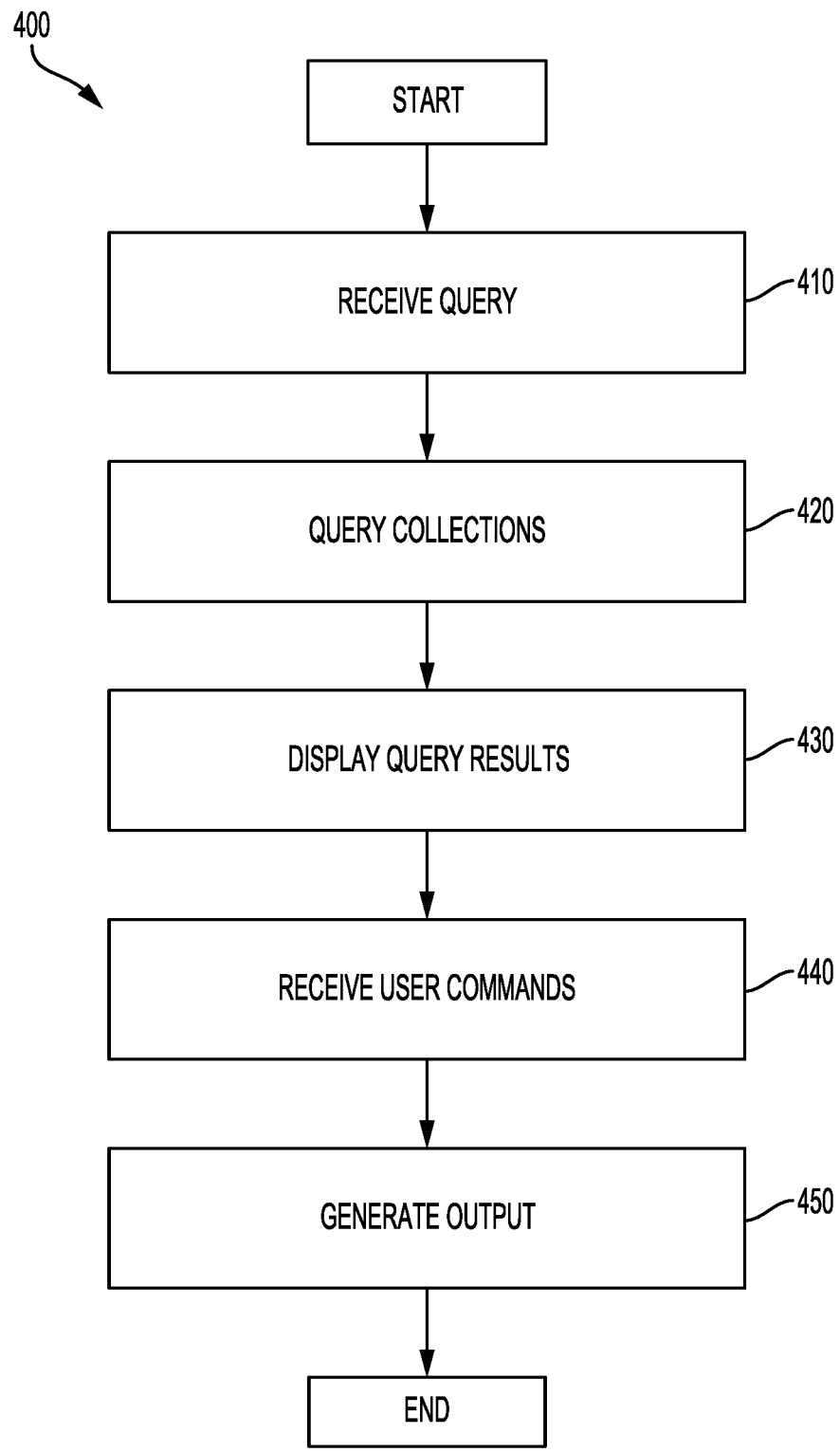
FIG. 4 is a flowchart representing an exemplary method performed by an electronic device for manipulating data, consistent with embodiments of the present disclosure.

FIG. 4 is a flowchart representing an exemplary process 400 performed by an electronic device for manipulating data, consistent with embodiments of the present disclosure. Process 400 is discussed as being performed by system 200. However, other hardware, software, or combinations of the two may be used to perform process 400 consistent with this disclosure.

Process 400 may begin at step 410, where system 200 receives a query from a user. In an embodiment, user interface 210 may receive user input for a search query. For example, a user may enter a text string. Query builder 214 may initiate a query based on the user text input. For example, query builder 214 may initialize an AbstractQuery object corresponding to the query text.

In an embodiment, query builder 214 may generate a query based on a user selection. A user may select a field of a displayed document or graph. For example, a user may selection a bar of a histogram corresponding to the month of March for the year 2013. Query builder 214 may generate a query based on month and year, as well as, the initial query on which the histogram is based. For example, query builder 214 may combine the logic of the sequential selection with the initial query to create a new instance of an AbstractQuery object.

Process 400 may include step 420 to query one or more collections. Query builder 214 may transmit a query to search engine 230 via application server 220. In an embodiment, query builder 214 may transmit an instance of an AbstractQuery object to mid-tier logic 224 for reformatting to be compatible with search engine 230. Once search processor 234 receives the translated search, it processes the request with aggregator 236 storing the ongoing results.

In an embodiment, prior to processing the query, search engine 230 may communicate with authenticator 222 to determine whether the current user of the session has sufficient credentials to perform the search on a particular collection. For example, authenticator 222 may provide a security token or cryptographic key indicating that the search may be performed.

In step 430 of process 400, user interface 210 may display query results. Once search processor 234 completes processing of a particular search, aggregator 236 may provide the search results to mid-tier logic 224, which may translate the search results into a format for user interface 210. User interface 210 may generate a graphical display of the reformatted results. For example, visualizer 216 may generate a grid of results, with fields of resulting documents being arranged in columns.

Process 400 may include step 440 to receive additional user commands. In an embodiment, user input may result in an additional query. As discussed previously, a user may provide input to further filter results of an initial query. Based on user input, after displaying query results (step 430), system 200 may generate an additional query, and process 400 may return to step 410.

In an embodiment, user commands may include commands to generate graphs or reports. A user may indicate that a plot of results over time should be generated. Visualizer 216 may receive user input and reformat results to match user input or predefined formatting criteria.

In step 450, process 400 may generate output based on search results. In an embodiment, visualizer 216 may render a chart. For example, visualizer 216 may calculate histogram values or pie chart values for a specific field of the search result documents. Visualizer 216 may produce other chart types based on configuration settings, such as user configurable graph settings or third party graph plug-ins.

In an embodiment, step 450 may include user interface 210 exporting the search results. User interface 210 may generate a file of raw text data or a common spreadsheet file format (e.g., Excel) to allow the user to use the search results data. In some embodiments, user interface 210 may permit the user to share the data to a workgroup within an organization or user social media. Sharing settings may be controlled by authenticator 222 based on user permission of collection configuration file 320. In some embodiments, system 200 may archive frequently used queries. For example, user interface 210 may store popular AbstractQuery instances. System 200 may facilitate or control the sharing of search results using other export and archive mechanisms consistent with this disclosure.

The steps of process 400 are discussed above in a particular order. However, certain steps may be rearranged or omitted. For example, the displaying of query results (step 430) may not occur until after receiving additional user input (step 440) indicating results display preferences. Other variations and permutations of process steps may be performed consistent with this disclosure.

Figure 5:
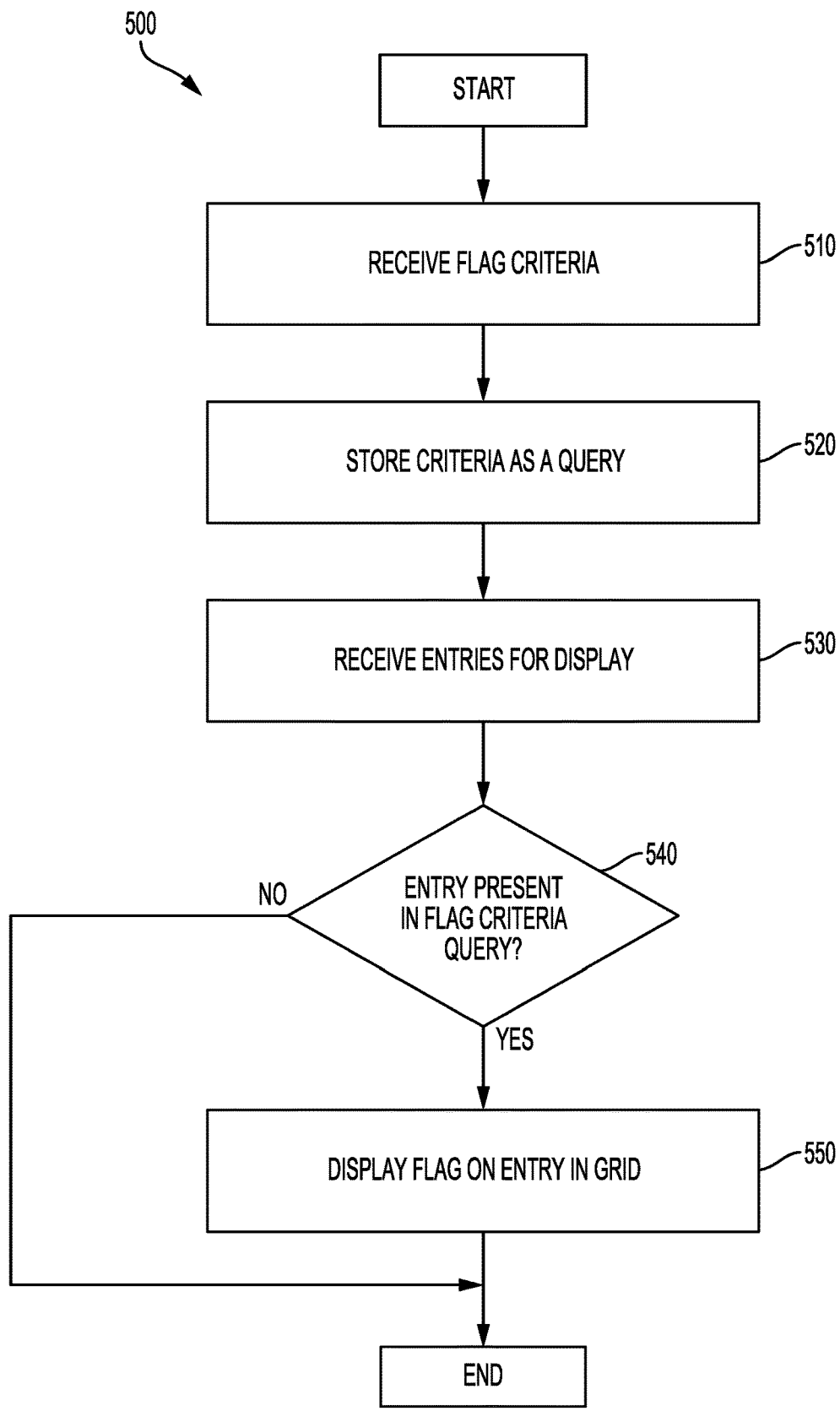
FIG. 5 is a flowchart representing an exemplary method performed by an electronic device for displaying flags, consistent with embodiments of the present disclosure.

FIG. 5 is a flowchart representing an exemplary process 500 performed by an electronic device for displaying flags, consistent with embodiments of the present disclosure. Process 500 is discussed as being performed by system 200. However, other hardware, software, or combinations of the two may be used to perform process 500 consistent with this disclosure.

Process 500 may begin at step 510 to receive flag criteria. User interface 210 may receive user input corresponding to a particular type of document to be flagged. The flag may be based on a particular field value. For example, a user may wish to flag all documents corresponding to transactions originating from Cedar Rapids, Iowa. More complex flag criteria may be processed by user interface 210, such as all transactions between John Huckleberry and Jane Foster over $1,000.

Process 500 may include step 520 where query builder 214 stores flag criteria as a query. Query builder 214 may generate an instance of an AbstractQuery corresponding to the query criteria, similar to the process performed in step 410 of process 400, discussed above.

In step 530 of process 500, user interface 210 may receive query results for display. A user may initiate a query, and system 200 may perform the steps of process 400 to generate the query results. However, prior to displaying the query results (e.g., step 430), when a flag has been created by a user, system 200 may further process the query results by determining if the query results include entries satisfying the flag criteria (step 540).

In some embodiments, step 540 may include determining whether results of the query match the flag query criteria. Rather than modifying the underlying data of result entries to include a flag, query builder 214 may generate a query describing the intersection of the query and flag criteria. When a display result of the query is present in the results of the intersection flag query (e.g., step 540, "Yes"), visualizer 216 may include a flag icon adjacent to the display result. When a displayed document is not present in the intersection flag query results (e.g., step 540, "No"), no flag is displayed.

The steps of process 500 are discussed above in a particular order. However, certain steps may be rearranged or omitted. For example, other query computations may be used to flag results based on this disclosure. Other variations and permutations of process steps may be performed consistent with this disclosure.

FIGS. 6A-6D are screenshots depicting an exemplary interface 600 for manipulating data, consistent with embodiments of the present disclosure. In some embodiments, interface 600 can be provided by an application. The application can include a web browser such as, for example, Google™ Chrome™, Mozilla™ Firefox™, Microsoft™ Internet Explorer™, etc.

Interface 600 may include various display regions, selection regions, and input fields. Query input field 610 of interface 600 may allow a user to provide text input to facilitate query creation by user interface 210. After a query has been performed, collection selection region 620, may list the collections that were queried and the number of results in each collection resulting from the query. As shown, for example, the "Database 1" collection has 17 entries resulting from the "John Huckleberry" query. Interface 600 may permit a user to select one or more collections to display the individual resulting documents. As shown selected collection 622 corresponds to the "Database 0" collection.

Cursor 601 may be used to indicate user input. For example, a user may select a particular region of interface 600. Responsive to the selection, interface 600 may initiate action, such as providing user input to system 200 for processing. Hardware such as a mouse or trackpad may control cursor 601. In an alternative embodiment, a touchscreen may be used, in which no cursor is displayed.

In some embodiments, interface 600 may include a tab structure to switch between different data views. As shown, interface 600 may include grid tab selection region 603, graph tab selection region 605, and reader tab selection region 607. These tabs may correspond to specific nested interfaces within interface 600.

Figure 6A:
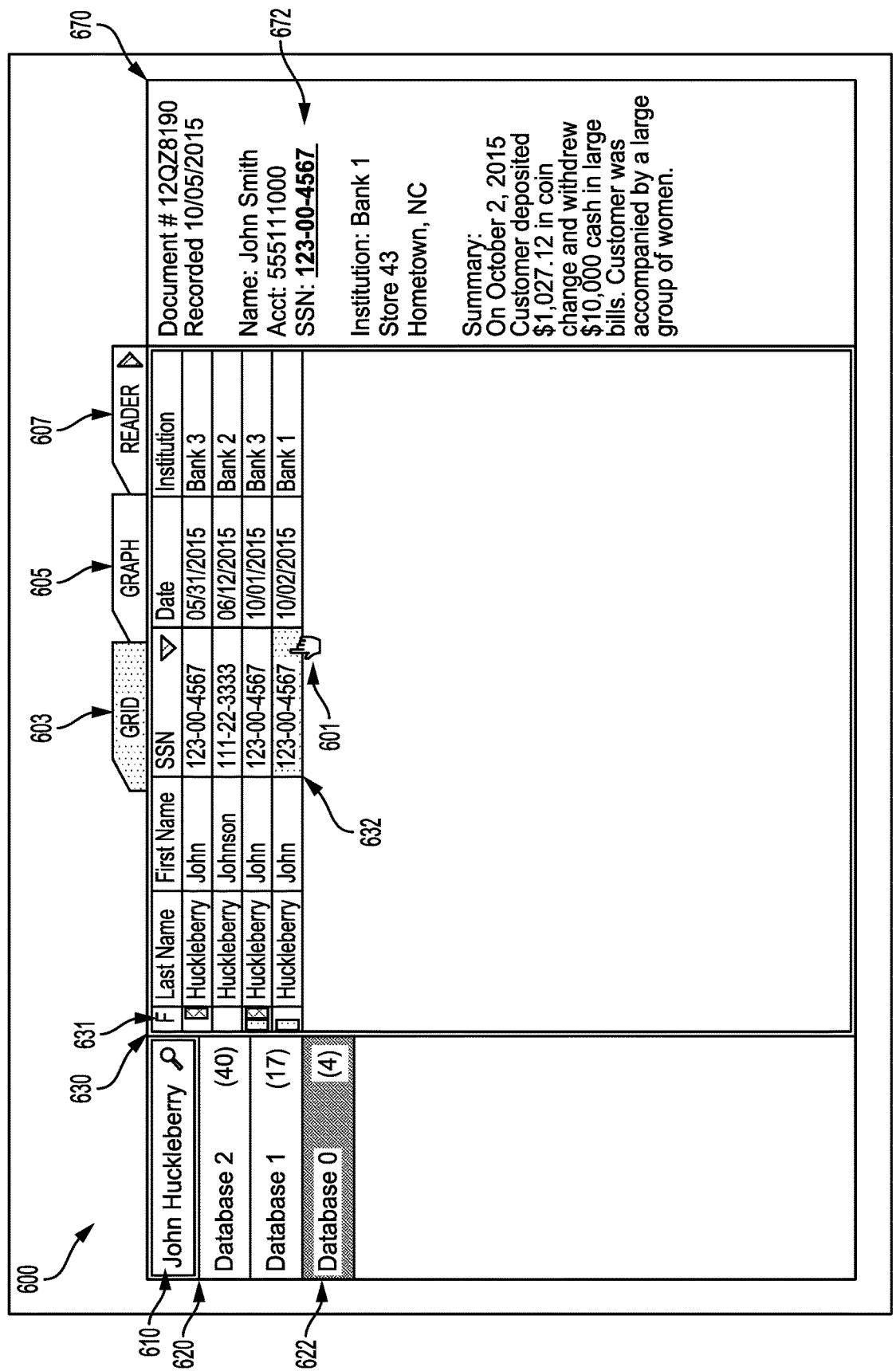
FIGS. 6A-6D are screenshots depicting an exemplary interface for manipulating data, consistent with embodiments of the present disclosure.

As shown in FIG. 6A, interface 600 may include grid interface 630 when grid tab selection region 603 is selected. Grid interface 630 may include a table of cells. Each row may correspond to a specific document resulting from a search query, while the columns may be coordinated to show the fields of the documents (e.g., based on collection configuration file 320). The columns may be sortable based on the data contained in the corresponding cells from high to low, alphabetically, or based on character values, depending upon the format of the data contained in the field.

In some embodiments, documents may be flagged (e.g., using process 500). As shown in flag column 631, multiple flags may be displayed at once. A user may sort flag column 631 based on the total number of flags on a document or based on particular combinations of flags.

In some embodiments, grid interface 630 may allow a user to select a given cell to provide additional data. As shown, input from cursor 601 has resulted in selected cell 632 corresponding to the social security number "123-00-4567". Based on the data in selected cell 632, additional searches may be initiated.

In an embodiment, document display region 670 may display the document of a particular grid entry. As shown, document display region 670 includes the document corresponding to selected cell 632. Document display region 670 may also highlight particular text based on user input. For example, interface 600 may underline text to draw users' attention to pertinent information. As shown, highlighted document text 672 corresponds to the data of selected cell 632.

Figure 6B:
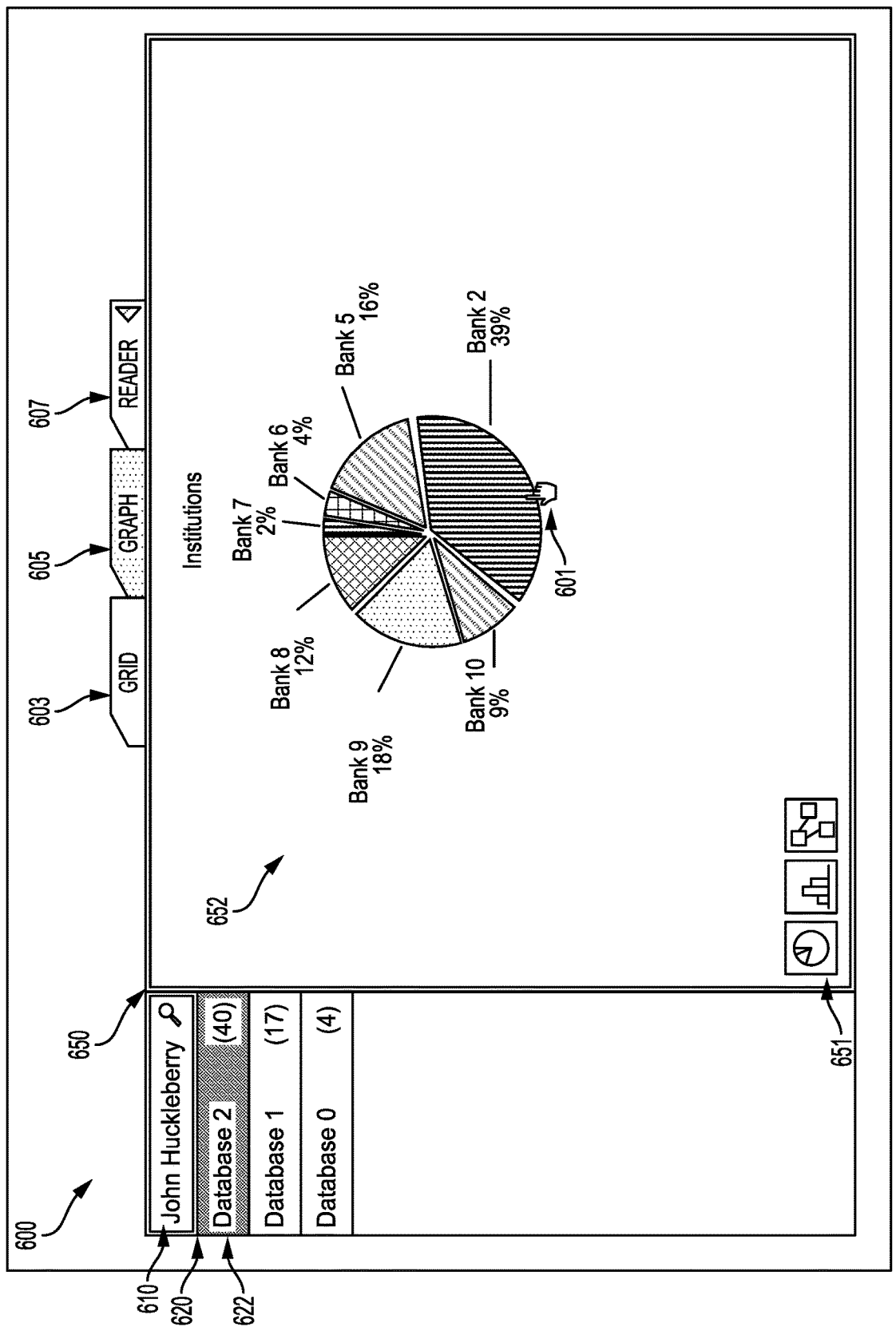

As shown in FIG. 6B, interface 600 may include graph interface region 650. Responsive to receiving user input corresponding to graph tab selection region 605, interface 600 may display various configurable graphs based on search results. For example, graph interface region 650 may include graph configuration selection region 651, which may contain various user input forms to manipulate and customize graphs.

In some embodiments, graph interface region 650 may include pie chart interface 652. The pie chart may illustrate the percentage breakdown of a particular field of the query results. For example, a user may select a column from grid interface 630, when switching to pie chart interface 652, visualizer 216 of system 200 may generate a chart indicating the distribution of results for the field of the selected column. A user may select a region of the pie chart using cursor 601 to further query results with the criteria of the region. As shown, cursor 601 may select a region of the chart initiating a query for results of "John Huckleberry" having "Bank 2" as the institution of the document.

Figure 6C:
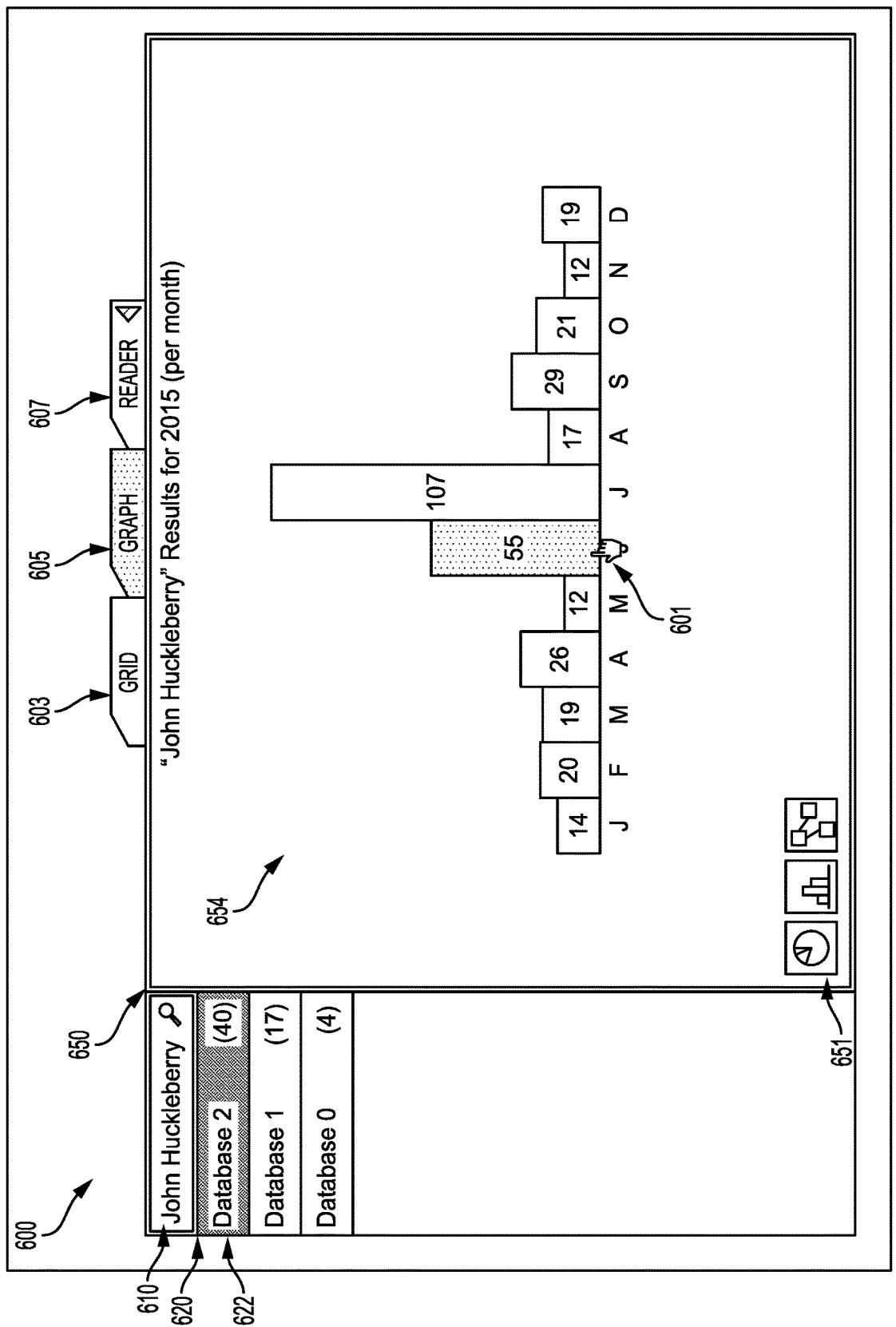

As shown in FIG. 6C, graph interface region 650 may include bar graph interface 654 based on user input in graph configuration selection region 651. As shown, bar graph interface 654 displays a histogram of results for the year 2015. The bars of the histogram may act as additional selection regions to perform narrower searches, displaying results for the corresponding month. Although a histogram is shown, bar graphs that display bars based on categories may also be displayed in bar graph interface 654. Additional graph types (not displayed) may also facilitated visual representation of search results.

Figure 6D:
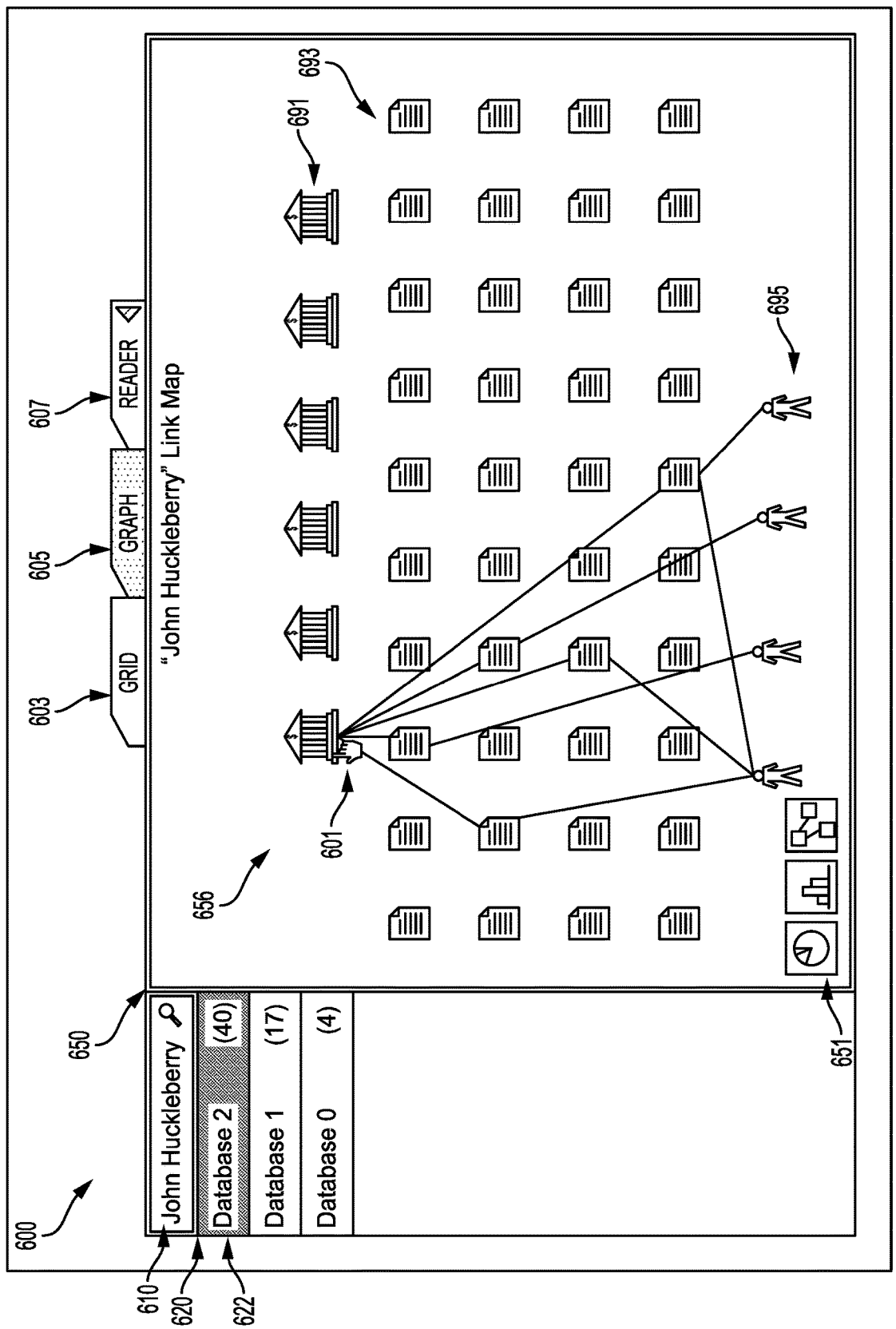

As shown in FIG. 6D, graph interface region 650 may include link map interface 656. Link map interface 656 may illustrate documents 693 resulting from a search, entities 695, and institutions 691 as icons. Responsive to selecting an icon, link map interface 656 may draw lines connecting one of more of institutions 691 or entities 695 to one or more of documents 693, including a reference to them. As shown, cursor 601 selects an institution. Responsive to the selection links are drawn through corresponding documents to their related entities. Based on this visual, a user may easily compare user interactions of documents. Link map interface 656 may rearrange icons to more clearly illustrate links, either automatically or based on user input.

Figure 7:
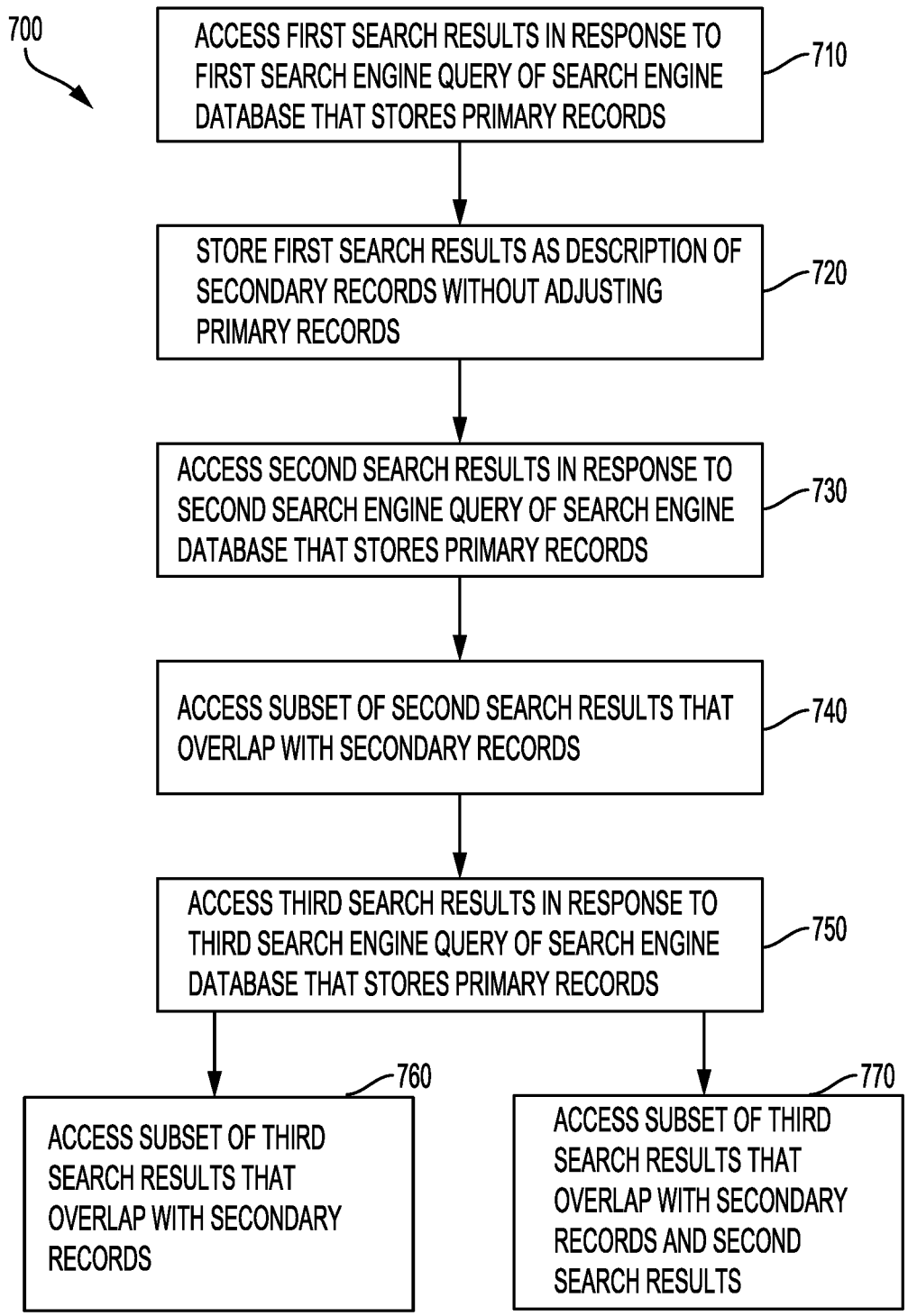
FIG. 7 is a flowchart representing an exemplary method performed by an electronic device to organize search results.

FIG. 7 is a flowchart 700 representing an exemplary method performed by an electronic device to organize search results.

At 710, at the client device, a set of first search results are accessed in response to a first search engine query of the search engine database that stores primary records. In one embodiment, the first search results are presented as aggregated search results from multiple databases. Each aggregated search result is a digest of search results in response to the first search engine query from a particular database of multiple databases. In one embodiment, the querying computer, accesses, in response to a selection of a particular aggregated search result, an itemization of the search results used in the particular aggregated search result. Access control is applied between the client device and other client devices such that other client devices lack access to the first search results.

At 720, the set of first search results are stored as secondary records. A description of the secondary records is stored locally at the querying client device, remotely from the querying client device, or a combination. The primary records of the search engine database do not have to be adjusted, thereby saving resources that would otherwise be committed to adjusting the search engine database, query after query.

At 730, at the client device, a set of second search results are accessed in response to a second search engine query of the search engine database that stores primary records. A description of the set of second search results is also stored locally at the querying client device, remotely from the querying client device, or a combination. Access control is applied between the client device and other client devices such that other client devices lack access to the first search results and the second search results.

At 740, at the client device, a subset of the set of second search results are accessed that overlap with the secondary records. The subset excludes second search results that fail to overlap with the secondary records.

At 750, at the client device, a set of third search results are accessed in response to a third search engine query of the search engine database that stores primary records. A description of the set of third search results are also stored locally at the querying client device, remotely from the querying client device, or a combination. Access control is applied between the client device and other client devices such that other client devices lack access to the first search results, the second search results, and the third search results.

At this point, either or both of 760 and 770 is performed.

At 760, at the client device, a subset of the set of third search results are accessed that overlap with the secondary records. The subset excludes third search results that fail to overlap with the secondary records.

At 770, at the client device, a subset of the set of third search results are accessed that overlap with the secondary records and the second set of search results. The subset excludes third search results that fail to overlap with the secondary records and the second set of search results.

FIG. 8 is a screenshot depicting an exemplary interface method for manipulating tables, consistent with embodiments of the present disclosure. Users can navigate, sort, and analyze billions of records. Example table manipulations include row selection, selection viewing, sorting, multiple values per column, and column choosing.

FIG. 9 is a screenshot depicting an exemplary interface method for table-based analysis, consistent with embodiments of the present disclosure. Examples of table-based analysis include filtering, grouping, row labels, term lists, and alerts.

In an example embodiment, filtering is performed on any field in the collection or some subset of fields. Such fields may or may not have been selected in the column chooser. In an example embodiment, the filter type depends on the column format. Example filters are text filters, enumerated filters, date filters, and number filters. In an example embodiment, hovering over filter shows options to disable, delete, or invert any filter. In an example embodiment, filters allow top-down analysis on a particular data collection.

FIG. 10 is a screenshot depicting an exemplary interface method for search, consistent with embodiments of the present disclosure. In an example embodiment, filters allow top-down analysis on multiple data collections. Example search results are displayed per collection and per field. Search fields can be defined for each data collection or for multiple data collections. In an example embodiment, specific search types are created or configured—for example, Name, Phone, Identifier≥to limit searches to a sub-selection of available fields.

Figure 11:
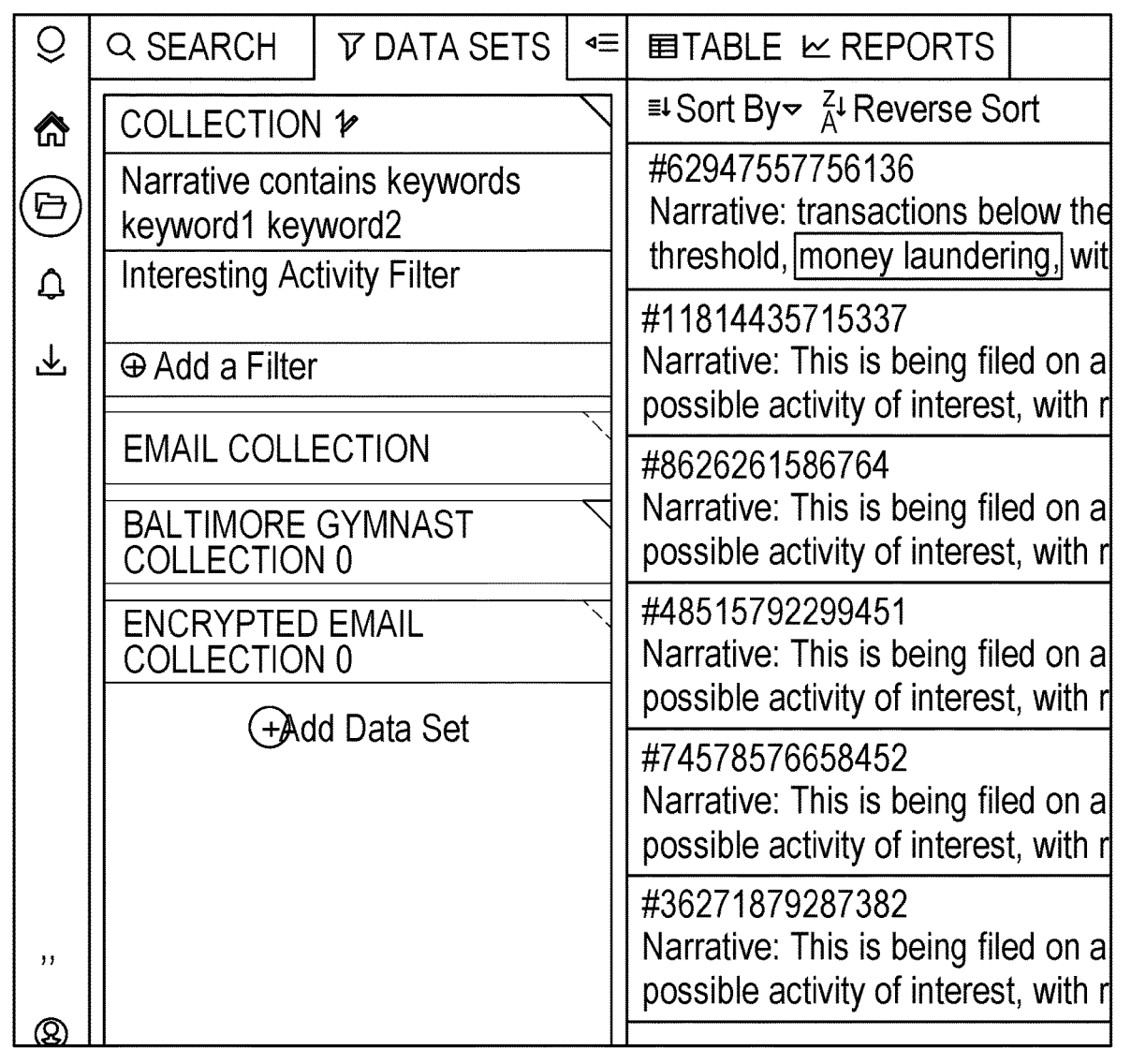

FIG. 11 is a screenshot depicting an exemplary interface method for a reading pane view, consistent with embodiments of the present disclosure. Data with large text fields can benefit from the reading pane view, which displays documents in a dossier format rather than the traditional table view. In one example embodiment, the reading pane view is accessed by clicking or otherwise selecting a corresponding tab of the window pane. In one example embodiment, in the reading pane view interface, filters remain active and configurable. In one example embodiment, text filters performed in the reading pane view display highlighted string matches, making it easy to search for key terms in large blocks of text.

Figure 12:
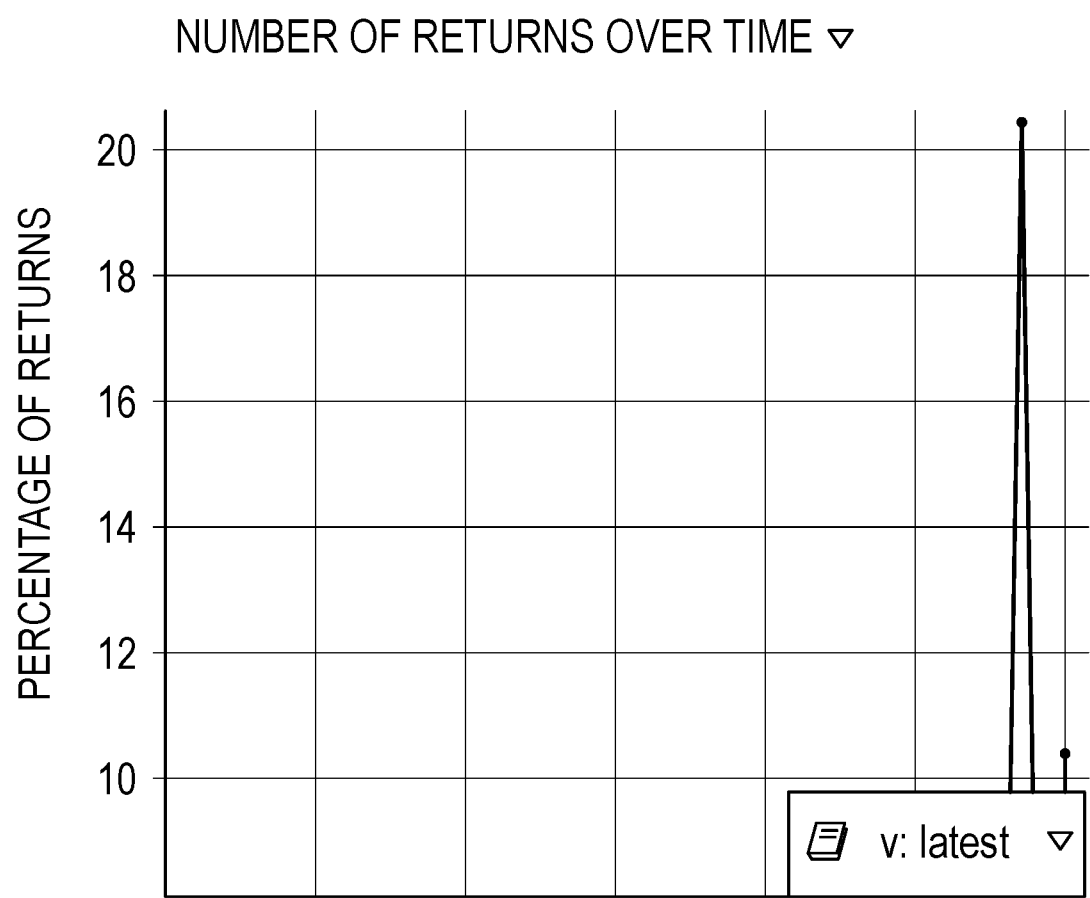
FIG. 12 is a screenshot depicting an exemplary interface method for data visualization, consistent with embodiments of the present disclosure.

FIG. 12 is a screenshot depicting an exemplary interface method for data visualization, consistent with embodiments of the present disclosure. Several visualizations of filtered data sets help identify patterns or anomalies in data. Visualizations are configurable for deployment or workflow.

Figure 13:
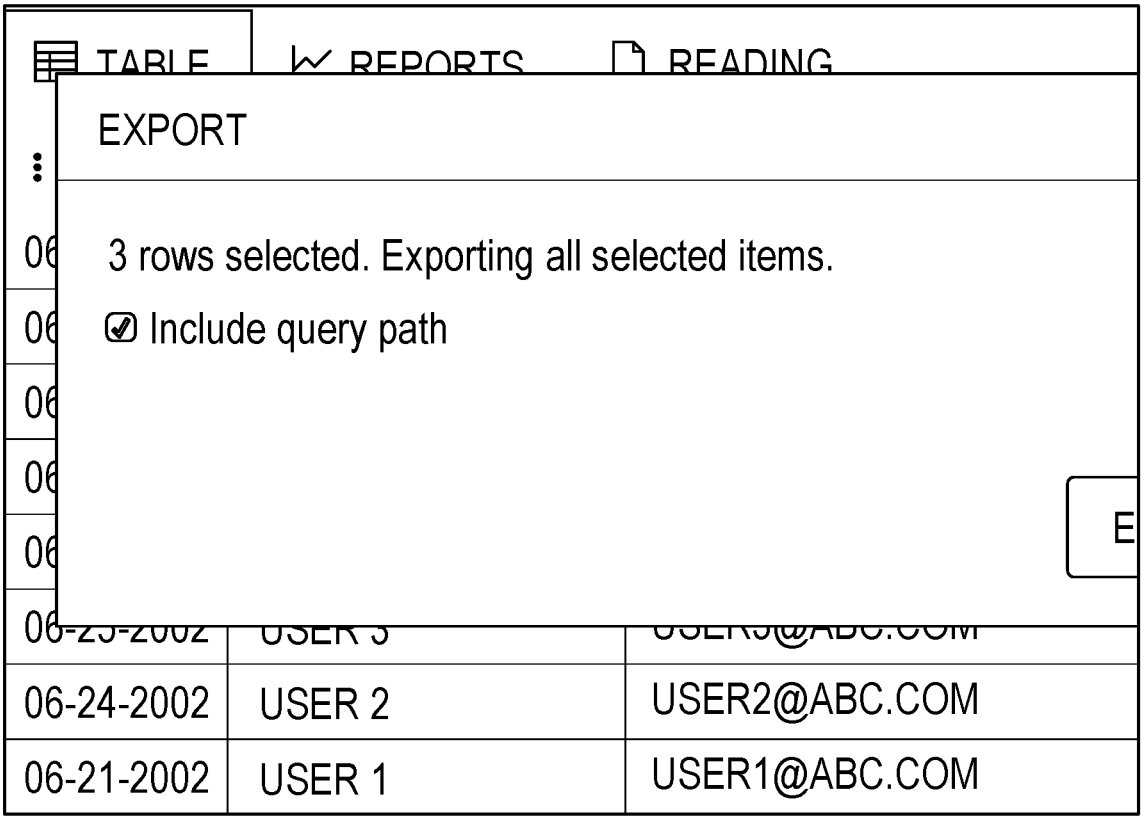
FIG. 13 is a screenshot depicting an exemplary interface method for exporting data, consistent with embodiments of the present disclosure.

FIG. 13 is a screenshot depicting an exemplary interface method for exporting data, consistent with embodiments of the present disclosure. In one example embodiment, export is supported to different workflows and file types. In one example embodiment, if no rows are selected, all rows in the current view are exported, if the configuration export threshold is not exceeded. Example export formats are xls, csv, and templatized doc.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    receiving, from a client device associated with a user account of a user, an input that defines a flag criteria, the flag criteria comprising a document field value;
    receiving a query that comprises a query term from the user account;
    initiating a query session;
    accessing a plurality of search results based on the query term of the query and a credential associated with the user account;
    identifying a search result from among the plurality of search results based on the document field value of the flag criteria;
    recording a state of the query session without user interaction, the recorded state of the query session including the query, an interrelated query, and a presentation format;
    detecting an unexpected interruption;
    in response to detecting the unexpected interruption, restarting the query session according to the recorded state of the query session including:
        recalling the search result and an interrelated search result associated with the interrelated query that were generated prior to the unexpected interruption;
        formatting the search result and the interrelated search result based on the presentation format recorded prior to the unexpected interruption; and
    causing display of a presentation of the plurality of search results at the client device, the presentation of the plurality of search results including a display of a flag icon based on a position of the search result among the presentation of the plurality of search results.

2. The method of claim 1, wherein the presentation of the plurality of search results comprises a spreadsheet grid.

3. The method of claim 1, wherein the presentation of the plurality of search results comprises a display region, and the method further comprises:
    receiving a selection of the search result from among the plurality of search results; and
    presenting a document that corresponds with the search result within the display region.

4. The method of claim 1, wherein the plurality of search results comprises a distribution of values, and wherein the causing display of the presentation of the plurality of search results further comprises:
    causing display of a visualization of the distribution of values of the plurality of search results.

5. The method of claim 4, wherein the visualization includes a graph.

6. The method of claim 1, wherein the receiving the query includes:
    receiving a selection of a field of a displayed document; and
    generating the query based on the field of the displayed document.

7. A system comprising:
    a processor; and
    a memory storing instructions that, when executed by the processor, causes the processor to perform operations comprising:
        receiving, from a client device associated with a user account, an input that defines a flag criteria, the flag criteria comprising a document field value;
        receiving a query that comprises a query term from the user account;
        initiating a query session;
        accessing a plurality of search results based on the query term of the query and a credential associated with the user account;
        identifying a search result from among the plurality of search results based on the document field value of the flag criteria;
        recording a state of the query session without user interaction, the recorded state of the query session including the query, an interrelated query, and a presentation format;

detecting an unexpected interruption;
in response to detecting the unexpected interruption, restarting the query session according to the recorded state of the query session including:
recalling the search result and an interrelated search result associated with the interrelated query that were generated prior to the unexpected interruption;
formatting the search result and the interrelated search result based on the presentation format recorded prior to the unexpected interruption; and
causing display of a presentation of the plurality of search results at the client device, the presentation of the plurality of search results including a display of a flag icon based on a position of the search result among the presentation of the plurality of search results.

8. The system of claim 7, wherein the presentation of the plurality of search results comprises a spreadsheet grid.

9. The system of claim 7, wherein the search result comprises a document.

10. The system of claim 9, wherein the presentation of the plurality of search results comprises a display region, and the operations further comprise:
receiving a selection of the search result from among the plurality of search results; and
presenting a document that corresponds with the search result within the display region.

11. The system of claim 7, wherein the plurality of search results comprises a distribution of values, and wherein the causing display of the presentation of the plurality of search results further comprises:
causing display of a visualization of the distribution of values of the plurality of search results.

12. The system of claim 11, wherein the visualization includes a graph.

13. The system of claim 7, wherein the receiving the query includes:
receiving a selection of a field of a displayed document; and
generating the query based on the field of the displayed document.

14. A non-transitory machine-readable storage medium comprising instructions that, when executed by one or more processors of a machine, cause the machine to perform operations including:
receiving, from a client device associated with a user account, an input that defines a flag criteria, the flag criteria comprising a document field value;
receiving a query that comprises a query term from the user account;
initiating a query session;
accessing a plurality of search results based on the query term of the query and a credential associated with the user account;
identifying a search result from among the plurality of search results based on the document field value of the flag criteria;
recording a state of the query session without user interaction, the recorded state of the query session including the query, an interrelated query, and a presentation format;
detecting an unexpected interruption;
in response to detecting the unexpected interruption, restarting the query session according to the recorded state of the query session including:
recalling the search result and an interrelated search result associated with the interrelated query that were generated prior to the unexpected interruption;
formatting the search result and the interrelated search result based on the presentation format recorded prior to the unexpected interruption; and
causing display of a presentation of the plurality of search results at the client device, the presentation of the plurality of search results including a display of a flag icon based on a position of the search result among the presentation of the plurality of search results.

15. The non-transitory machine-readable storage medium of claim 14, wherein the presentation of the plurality of search results comprises a display region, and the operations further comprise:
receiving a selection of the search result from among the plurality of search results; and
presenting a document that corresponds with the search result within the display region.

16. The non-transitory machine-readable storage medium of claim 14, wherein the plurality of search results comprises a distribution of values, and wherein the causing display of the presentation of the plurality of search results further comprises:
causing display of a visualization of the distribution of values of the plurality of search results.

17. The non-transitory machine-readable storage medium of claim 14, wherein the receiving the query includes:
receiving a selection of a field of a displayed document; and
generating the query based on the field of the displayed document.

18. The method of claim 1, wherein the initiating a query session comprises:
initiating the query session for the user; and
loading one or more user preferences associated with the user;
wherein the state of the query session further includes the one or more user preferences.

19. The method of claim 1, wherein the interruption includes at least one selected from a group consisting of a break of the query session, an error, a crash of the query session, and a malfunction.

* * * * *